United States Patent [19]
Wilson

[11] 3,927,503
[45] Dec. 23, 1975

[54] PREVAILING TORQUE FASTENER

[75] Inventor: Charles A. Wilson, Williamstown, N.J.

[73] Assignee: Standard Pressed Steel Co., Jenkintown, Pa.

[22] Filed: Dec. 26, 1973

[21] Appl. No.: 428,112

[52] U.S. Cl. .................................. 52/758 F; 151/22
[51] Int. Cl.² .................... F16B 5/02; F16B 39/30
[58] Field of Search ............... 151/22, 14 R; 85/46; 10/10 R, 86 A; 52/758 F

[56] References Cited
UNITED STATES PATENTS

| | | | |
|---|---|---|---|
| 2,349,592 | 5/1944 | Hosking | 151/22 |
| 3,481,380 | 12/1969 | Breed | 151/22 |
| 3,661,194 | 5/1972 | Macfarlane et al. | 151/22 |
| 3,721,283 | 3/1973 | Evans | 151/22 |
| 3,850,215 | 11/1974 | Orlomoski | 151/22 |

*Primary Examiner*—Ramon S. Britts
*Attorney, Agent, or Firm*—Andrew L. Ney; Aaron Nerenberg

[57] ABSTRACT

A prevailing torque fastener comprising an externally threaded shank having a locking portion comprising a displaced thread segment including an offset root and a correspondingly offset crest. When engaged with a mating internal thread, the locking portion causes the mating thread to deform at its minor diameter with little or no deformation at its pitch or major diameter.

30 Claims, 4 Drawing Figures

PREVAILING TORQUE FASTENER

This application relates to self-locking fasteners and, more particularly, to self-locking fasteners of the prevailing torque type and to joint assemblies in which prevailing torque type fasteners are used.

Self-locking fasteners of the prevailing torque type generally include an externally threaded shank having a locking portion including axially deflected or otherwise axially deformed thread portions. When engaged with a mating thread, the locking portion provides additional force on the mating thread which adds to the torque required to rotate the fastener relative to the mating thread. Thus, additional resistance to loosening of the fastener due to vibration and other accidental torque is provided.

When conventional prevailing torque type fasteners are seated in a mating piece, the locking portion does not deform to any substantial extent, but causes a plastic deformation or, in most applications, a shearing of the flank of the mating thread in the region of its pitch and major diameters.

Thus, the cross-sectional configuration of the mating thread is significantly reduced and otherwise deformed. After the fastener is removed from the mating piece, the mating thread is so deformed that it is generally not reusable in a satisfactory manner; after several removals of the fastener from the mating piece, the mating thread can be so damaged that it may not be reusable at all. When the mating piece is a nut, the nut is usually replaced after one or two removals of the fastener which results in added expense in maintaining the joint. When the mating piece is a joint member having a tapped hole forming the mating thread, the hole must be redrilled and tapped and oversized fasteners must be used. Accordingly, maintaining a joint utilizing a prevailing torque type fastener and a tapped hole in a workpiece is also relatively expensive. In addition to the expense, the reduction in the cross-section of the thread on the mating piece, nut or tapped hole, significantly reduces the strength of the joint.

It is an object of this invention, therefore, to provide a prevailing torque type fastener that allows for increased reusability of the mating thread.

It is another object of this invention to provide a prevailing torque type fastener that does not significantly deform the mating thread flanks at the pitch or major diameters.

It is yet another object of this invention to provide a joint including a prevailing torque type fastener and a mating thread having improved reusability.

These and other objects of this invention are accomplished by providing a prevailing torque type fastener having a thread configuration formed on the shank thereof which includes normally load bearing and non-load bearing flanks joined at the major diameter by a crest and separated at the minor diameter by a root. The crest and root of the thread each define a normal helix angle through which the thread conforms. At least one segment of the thread is formed with a locking portion in which the thread is displaced, that is, the root is axially offset relative to the normal helix angle and in which the crest adjacent the offset root is also axially offset relative to the normal helix angle. When the fastener is seated in a mating threaded part, neither the pitch nor the major diameters of the mating thread are significantly deformed and, accordingly, the reusability of the mating thread is greatly enhanced. Actually, the deformation of the mating thread occurs generally in the region of the minor diameter such that the material in this region flows inwardly toward the center of the mating part causing both the diameter and the cross-section of the mating thread at the minor diameter to be reduced.

In the preferred embodiment of the invention described herein, each locking portion has a circumferential extent less than 180° and a plurality of locking portions are formed adjacent each other on the same thread convolution. As also disclosed in the preferred embodiment, locking portions are provided on a plurality of adjacent thread convolutions, but are not provided on at least one full thread convolution from the free end of the fastener.

For a better understanding of the invention, reference may be made to the following description of a preferred embodiment, taken in conjunction with the figures of the accompanying drawings in which.

Figure 1:
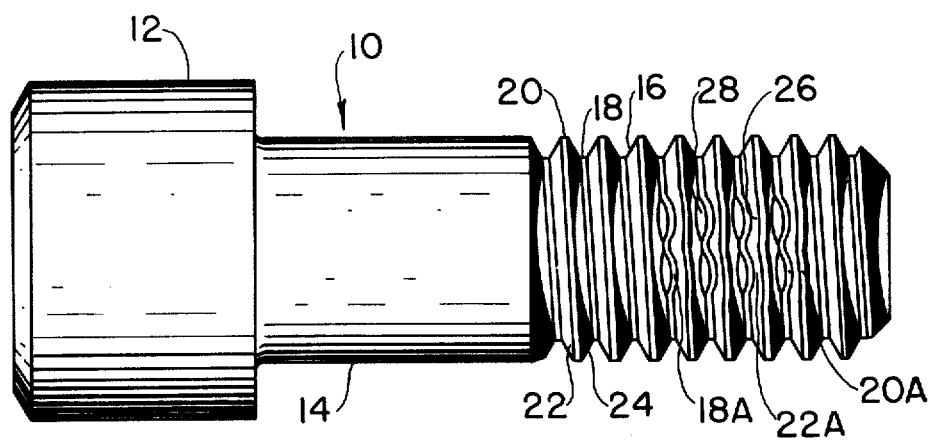
FIG. 1 is a front view of a prevailing torque type fastener in accordance with this invention.

Referring particularly to FIG. 1, there is illustrated a prevailing torque type fastener in accordance with this invention in the form of a screw 10 having a head portion 12 and a shank portion 14. Head portion 12 includes a suitable wrenching configuration and in the embodiment illustrated herein is a socket head having an internal recess (not shown) for receiving a wrenching member, but it should be understood that any suitable configuration can be utilized. Further, it should be understood that a head need not be utilized, but that a wrenching configuration could be formed in the end of a shank portion 14 to form a set screw. Formed on shank portion 14 is a helical thread 16 including a root 18 and a crest 20 each of which connects a generally load bearing flank 22 and a generally non-load bearing flank 24. By the term load bearing flank is meant that flank of a conventional thread which when the bolt is engaged with a mating thread contacts the mating thread and is subjected to the load exerted by the tightening of the bolt; by the term non-load bearing flank is meant that flank of a conventional thread which is subjected to little or no load when the bolt is engaged in the mating thread. Root 18, of course, connects the flanks at the minor diameter of the thread and crest 20 connects the flanks at the major diameter of the thread. Both root 18 and crest 20 define a helix angle as is usual in the art.

In the preferred embodiment disclosed herein thread 16 is formed with two adjacent locking portions 26 on each of a plurality of adjacent thread convolutions. By the term "thread convolution" is meant any 360° segment around the thread. Since each locking portion 26 is generally the same, only one will be described in detail. Each locking portion 26 comprises a displacement of a segment of the helical thread and includes a displaced root portion 18a, that is, a root portion that is axially offset from or deviates from the normal helix angle defined by root 18. Crest portion 20a radially adjacent root portion 18a is also displaced, that is, offset relative to the helix angle defined by the crest 20 and in the same general direction as root portion 18a. Both root portion 18a and crest portion 20a are offset toward the point end of the screw, that is, the free end thereof, but the crest portion is offset a lesser distance than the root portion. The displacement is gradual starting at either circumferential end of locking portion 26 and increases to a maximum at the midpoint between the ends. In addition, crest portion 20a is radially displaced relative to crest 20 so that it defines a slightly larger major diameter than the crest and is also axially longer or thicker than the crest.

Figure 3:
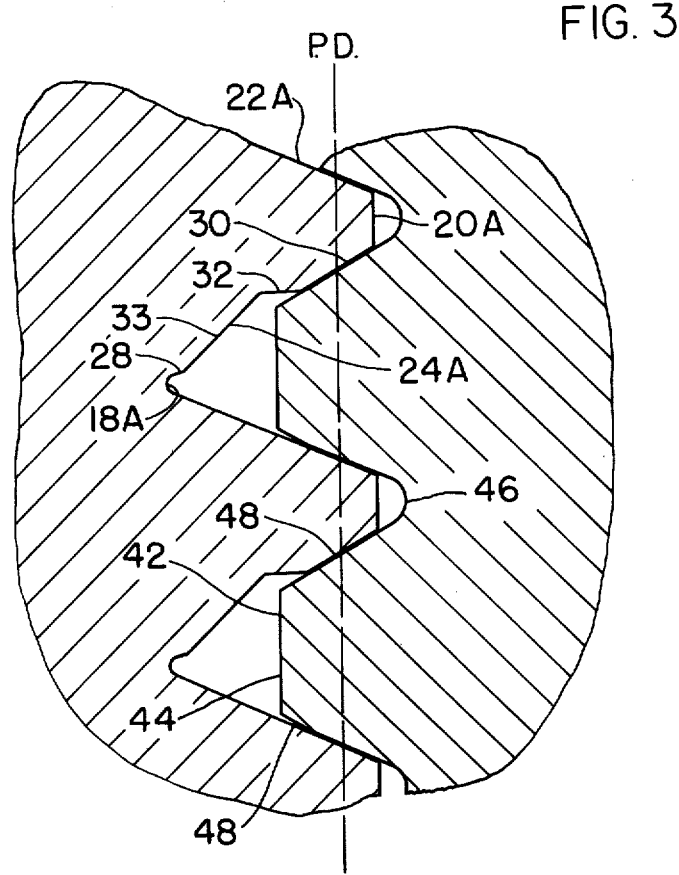
FIG. 3 is an enlarged section view of the circled portion illustrated in FIG. 2; and, FIG. 4 is a schematic drawing of a mating thread illustrating its configuration before and after engagement with the fastener illustrated in FIG. 1.

Flank portion 22a connecting root portion 18a and crest portion 20a is, of course, also displaced or offset relative load bearing flank 22 and flank portion 24a is also displaced or offset relative to non-load bearing flank 24. As best seen in FIG. 3, flank portion 22a is a generally planar surface or may be slightly concave while flank portion 24a is formed with a bulge that includes a first surface 30 extending at an increased angle relative to crest portion 20a so that a larger angle is included between flank portion 22a and surface 30 than is included between flanks 22 and 24. Thus, the axial thickness of the thread through the locking portion is increased as well as the thickness of crest portion 20a. Extending from offset surface 30 is a second offset surface 32 which in the preferred embodiment disclosed herein, defines a plane that extends generally radially through shank 14 and which terminates generally in the vicinity of the pitch diameter of thread 16. Extending inwardly at an angle from surface 32 toward root portion 18a is a third surface 33 which terminates at a small bubble 28 of lapped material which extends slightly from the root portion at an angle to shank 14. Bubble 28 may be so small as to be barely visible and, it is believed, is formed by some of the original root configuration prior to formation of the locking portion as will be more fully explained hereinafter.

Two locking portions 26 are illustrated adjacent each other on each of four thread convolutions. It should be understood, however, that only one such locking portion need be provided on each convolution but that the use of two locking portions is preferred since it distributes the added locking force over a greater area and reduces the pressure on the thread. Further, it should be understood that if locking portions 26 are to be provided on more than one thread convolution, they need not be placed on adjacent threads but they may be located on alternate thread convolutions or on every third convolution etc.. In the preferred embodiment, it is desirable to leave at least one thread convolution at the point end of the screw with no locking portion to facilitate the starting of the screw in a mating thread. Finally, as shall be made clear hereinafter, it is preferable that the circumferential extent of the locking portions on any convolution not extend 180°.

Figure 2:
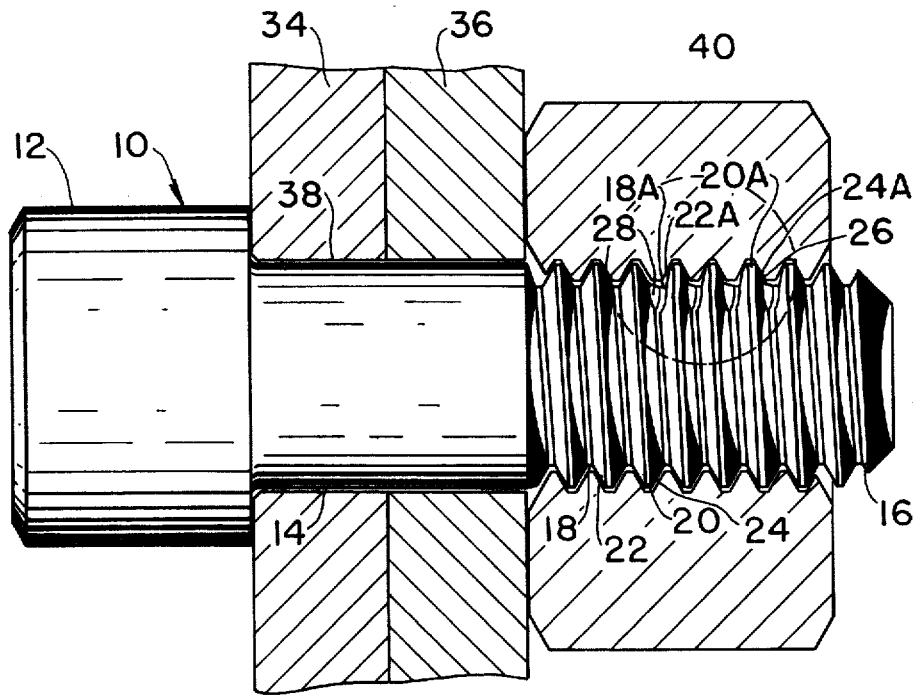
FIG. 2 is a side view of a joint with portions thereof in section and including the prevailing torque type fastener illustrated in FIG. 1.

Referring now to FIG. 2, screw 10 in accordance with this invention is illustrated in a joint comprising a plurality of workpieces 34 and 36 having an opening 38 extending therethrough. Screw 10 is used to secure workpieces 34 and 36 by cooperating with a nut 40 having an internal thread 42. While a nut is illustrated, it should be understood that a nut need not be utilized and that a mating thread could be formed directly in one of the workpieces. Thread 42 includes a minor diameter portion 44, a major diameter portion 46, and a pair of flanks 48. In addition, as is usual, thread 42 includes a pitch diameter, P.D. as shown in FIG. 3, that is, a diameter between minor diameter 44 and major diameter 46.

Figure 4:
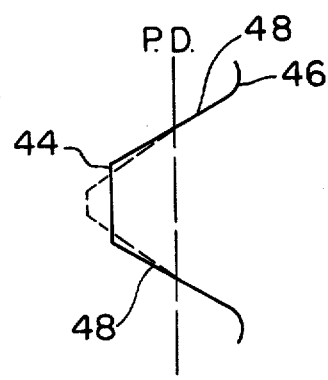

In use, self-locking screw 10 is threadably engaged with nut 40 in a conventional manner. When locking portions 26 engage mating thread 42, the locking portions undergo a slight elastic deformation and also cause deformation of mating thread 42. The deformation of locking portions 26 may be elasto-plastic, i.e., primarily elastic with some small percentage being plastic. The deformation of mating thread 42, occurs primarily along the flanks 48 in the vicinity of minor diameter 44 and as best seen in FIG. 4 the material forming thread 42 flows inwardly toward shank 14 of bolt 10 from a point inwardly of the pitch diameter P.D. causing the minor diameter to become smaller both in the diameter and in axial thickness. In FIG. 4, the original configuration of thread 42 is illustrated in solid lines and the configuration after engagement with locking portions 26 is illustrated in dotted lines. It should be noted that little or no deformation of thread 42 occurs along flanks 48 in the region extending from pitch diameter P.D. to major diameter 48. Since the mating thread is not substantially deformed in the region where it is engaged by the thread of the fastener, the reusability of the mating thread is improved.

While the exact reason why little or no deformation of mating thread 42 occurs in the region between pitch diameter P.D. and major diameter 46 is not fully understood, it is believed that since flank portions 22a and 24a engage both flanks 48 of the mating thread in that region, movement of material forming the mating thread in that region is resisted by flank portions 22a and 24a. However, little or no contact between flank portions 22a and 24a occurs inwardly of pitch diameter P.D. so that the material forming thread 42 can flow inwardly thus reducing minor diameter 44 in both diameter and thickness.

In addition, it has been observed that as locking portions 26 engage mating thread 42, there is a tendency to pull the nut off axis toward the right as shown in FIG. 2 so that at a point spaced 180° from the locking portions, there is a tighter engagement between thread 16 and thread 42 which adds to the locking characteristic of the assembly. It is for this reason that it is preferred to keep the circumferential extent of locking portions 26 less than 180°. Of course, if the additional locking is desired, locking portions 26 should be axially aligned on adjacent thread convolutions. At this point it will be noted that screw 10 can be economically manufactured by generally conventional techniques. The difference in manufacturing techniques resides in the thread-rolling operation which would involve the use of a thread rolling die having a plurality of displaced rib portions complementary to locking portions 26 formed adjacent one end. The screw blank is rolled between a pair of dies as is conventional to first form helical thread 16 on the shank portion of the blank. As the blank continues to rotate between the dies it engages with the displaced rib portions to displace thread 16 and form locking portions 26. When thread 16 is displaced some of the material adjacent root 18 flows to form root portion 18a and a small amount flows toward head 12 into overlapping relationship with the normally non-load flank of the thread to form bubble 28. This bubble is not always formed but appears to be present in most instances.

While in the foregoing there has been disclosed a preferred embodiment of the invention, it should be understood that various modifications may be made thereto without departing from the scope of the invention as recited in appended claims.

I claim:

1. A prevailing torque type fastener comprising a shank portion having a thread configuration formed thereon, said thread configuration including a portion having a normally load bearing flank and a normally non-load bearing flank, said flanks being joined at their major diameter by a crest and at their minor diameter by a root, said crest and said root each defining a helix angle around said shank, at least one segment of said thread configuration being formed at a locking portion wherein said root is axially displaced relative to the helix angle of the root of the remainder of the thread configuration and wherein the entire crest adjacent said displaced root is also axially displaced relative to the helix angle and is axially thicker than said crest defining said helix angle of the crest of the remainder of the thread configuration, and wherein the surface of said locking portion includes a first surface flank portion adjacent said displaced crest for bearing on a mating thread when in engagement therewith and a second surface flank portion relieved from said first surface flank portion intermediate said displaced root and said first surface flank portion, said locking portion being non-symmetrically disposed on the circumference of said one segment of said thread configuration.

2. A prevailing torque type fastener in accordance with claim 1 wherein said normally load bearing flank between said displaced root and said displaced crest is also displaced.

3. A prevailing torque type fastener in accordance with claim 1 wherein said locking portion is formed on said normally non-load bearing flank and wherein said normally non-load bearing flank between said displaced root and said displaced crest is also displaced relative to its helix angle, said first surface flank portion extending at an angle from said displaced crest, the included angle between said normally load bearing flank and said first surface flank portion being greater than the angle between said normally load bearing flank and said normally non-load bearing flanks joining said root and crest defining helix angles, and said second surface flank portion extending inwardly from said first surface flank portion toward the axis of said fastener.

4. A prevailing torque type fastener in accordance with claim 3 wherein said normally non-load bearing flank includes a third surface flank portion extending from said second surface flank portion toward the root of the adjacent load bearing flank.

5. A prevailing torque type fanstener in accordance with claim 1 including a plurality of said locking portions.

6. A prevailing torque type fastener in accordance with claim 5 wherein said locking portions are adjacent each other on the same thread convolution.

7. A prevailing torque type fastener in accordance with claim 5 wherein said locking portions are on adjacent thread convolutions.

8. A prevailing torque type fastener in accordance with claim 1 wherein said locking portion has a circumferential extend less than 180°.

9. A prevailing torque type fastener in accordance with claim 6 wherein said locking portions have a total circumferential extent less than 180°.

10. A joint assembly comprising a plurality of workpieces having an opening extending therethrough, a threaded fastener including a shank portion having an external thread formed thereon with a normally load bearing flank and a normally non-load bearing flank and an internal thread configuration having a mating thread generally complementary to said external thread, the improvement comprising:

a locking portion formed on said external thread including an axially displaced thread segment relative to the remainder of said external thread having an axially displaced root and an entire crest being axially displaced adjacent said displaced root, wherein said displaced crest is axially thicker than the crest of said external thread, and wherein the surface of said locking portion includes a first surface flank portion adjacent said displaced crest for bearing on a portion of said mating thread causing a deformation of said internal thread adjacent its minor diameter without substantially deforming said mating thread between its pitch diameter and its major diameter, and a second surface flank portion relieved from said first surface flank portion intermediate said displaced root and said first surface flank portion, said locking portion being non-symmetrically disposed on the circumference of one segment of said external thread.

11. A joint assembly in accordance with claim 10 wherein said deformation of said mating thread comprises a reduction in the axial thickness of said internal thread adjacent its minor diameter and a reduction in the minor diameter.

12. A joint assembly in accordance with claim 10 wherein said mating thread is pulled off axis by said locking portion whereby said external thread 180° from said locking portion exerts additional force on said mating thread.

13. A joint assembly in accordance with claim 10 wherein said mating thread is formed in one of said workpieces.

14. A joint assembly in accordance with claim 10 wherein said mating thread is formed in a nut member.

15. A prevailing torque fastener in accordance with claim 1 wherein said locking portion is displaced toward said normally non-load bearing flank.

16. A joint assembly in accordance with claim 10 wherein said locking portion is displaced toward the normally non-load bearing flank.

17. A prevailing torque type fastener comprising a shank portion having a thread configuration formed thereon, said thread configuration including a portion having a normally load bearing flank and a normally non-load bearing flank, said flanks being joined at their major diameter by a crest and at their minor diameter by a root, said crest and said root each defining a helix angle around said shank, at least one segment of said thread configuration being formed as a locking portion wherein said root is axially displaced relative to the helix angle of the root of the remainder of the thread configuration and wherein the entire crest adjacent said displaced root is also axially displaced relative to the helix angle of the crest of the remainder of the thread configuration and is axially thicker than said crest defining said helix angle, the surface of said locking portion between said displaced root and said displaced crest including a first surface flank portion adjacent said displaced crest for bearing on a mating thread when in engagement therewith and a second surface portion relieved from said first surface portion intermediate said displaced root and said first surface flank portion.

18. A prevailing torque type fastener in accordance with claim 17 wherein said normally load-bearing flank between said displaced root and said displaced crest is also axially displaced.

19. A prevailing torque type fastener in accordance with claim 17 wherein said locking portion is formed on said normally non-load bearing flank and wherein said normally non-load bearing flank between said displaced root and said displaced crest is also displaced relative to its helix angle, said first surface flank portion extending at an angle from said displaced crest, the included angle between said normally load bearing flank and said first surface flank portion being greater than the angle between said normally load bearing flank and said normally non-load bearing flanks joining said root and crest defining helix angles, and said second surface flank portion extending inwardly from said first surface flank portion toward the axis of said fastener.

20. A prevailing torque type fastener in accordance with claim 19 wherein said normally non-load bearing flank includes a third surface flank extending from said second surface flank toward the root of the adjacent load bearing flank.

21. A prevailing torque type fastener in accordance with claim 17 including a plurality of said locking portions displaced toward said normally non-load bearing flank.

22. A prevailing torque type fastener in accordance with claim 21 wherein said locking portions are adjacent each other on the same thread convolution.

23. A prevailing torque type fastener in accordance with claim 21 wherein said locking portions are on adjacent thread convolutions.

24. A prevailing torque type fastener in accordance with claim 17 wherein said locking portion has a circumferential extend less than 180°.

25. A prevailing torque type fastener in accordance with claim 22 wherein said locking portions have a total circumferential extent less than 180°.

26. A prevailing torque type fastener comprising a shank portion having a thread configuration formed thereon, said thread configuration including a portion having a normally load bearing flank and a normally non-load bearing flank, said flanks being joined at their major diameter by a crest and at their minor diameter by a root, said crest and said root each defining a helix angle around said shank, at least one segment of said thread configuration having at least two locking portions thereon wherein said root is axially displaced relative to the helix angle of the root of the remainder of the thread configuration and the entire crest adjacent said displaced root is also axially displaced relative to the helix angle of the crest of the remainder of the thread configuration and is axially thicker than said crest defining said helix angle, and wherein said normally non-load bearing flank between said displaced root and said displaced crest is also axially displaced relative to its helix angle and is formed with a bulge that includes a first offset flank surface extending at an angle from said offset crest, the included angle between said normally load bearing flank and said first offset flank surface being greater than the angle between said normally load bearing flank and said normally non-load bearing flanks joining said root and crest defining helix angles, said normally non-load bearing flank in said locking portion further including a second offset flank surface extending inwardly from said first offset surface toward the axis said shank of said fastener, said locking portions being displaced toward said normally non-load bearing flank.

27. A prevailing torque type fastener in accordance with claim 26 wherein said normally load bearing flank between said displaced root and said displaced crest is also axially displaced.

28. A prevailing torque type fastener in accordance with claim 26 wherein said normally non-load bearing flank includes a third flank surface extending from said second offset surface toward the root of the adjacent load bearing flank.

29. A prevailing torque type fastener in accordance with claim 26 wherein said locking portions are on adjacent thread convolutions.

30. A prevailing torque type fastener in accordance with claim 26 wherein said locking portions are adjacent each other on the same thread convolution and have a total circumferential extent less than 180°.

* * * * *

UNITED STATES PATENT AND TRADEMARK OFFICE
CERTIFICATE OF CORRECTION

PATENT NO. : 3,927,503
DATED : December 23, 1975
INVENTOR(S) : Charles A. Wilson It is certified that error appears in the above—identified patent and that said Letters Patent are hereby corrected as shown below:

Column 2, line 42, "a", first occurrence, should be deleted;

Claim 1, line 9, "at" should read -- as --;
       line 14, after "angle", the following recitation should be inserted -- of the crest of the remainder of the thread configuration --;
       lines 15 - 16, the following recitation should be deleted -- of the crest of the remainder of the thread configuration --;
Claim 8, line 3, "extend" should read -- extent --;
Claim 17, line 20 and line 21, after "surface" in each line, -- flank -- should be inserted;
Claim 20, line 3, after "flank", second occurrence, -- portion -- should be inserted;
       line 4, after "flank", -- portion -- should be inserted;
Claim 24, line 3, "extend" should read -- extent --;
Claim 26, line 29, "said shank" should be deleted.

Signed and Sealed this

Fourth Day of January 1977

[SEAL]

Attest:

RUTH C. MASON
*Attesting Officer*

C. MARSHALL DANN
*Commissioner of Patents and Trademarks*